(12) United States Patent
Huang-Fu et al.

(10) Patent No.: US 10,798,640 B2
(45) Date of Patent: Oct. 6, 2020

(54) ENHANCEMENT OF UNIFIED ACCESS CONTROL

(71) Applicant: MEDIATEK INC., Hsinchu (TW)

(72) Inventors: Chien-Chun Huang-Fu, Hsinchu (TW); Per Johan Mikael Johansson, Kungsangen (SE); Guillaume Sebire, Oulu (FI); Yuanyuan Zhang, Beijing (CN)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/862,641

(22) Filed: Jan. 5, 2018

(65) Prior Publication Data
US 2018/0199263 A1  Jul. 12, 2018

Related U.S. Application Data

(60) Provisional application No. 62/443,642, filed on Jan. 6, 2017.

(51) Int. Cl.
*H04W 48/06* (2009.01)
*H04W 28/02* (2009.01)

(52) U.S. Cl.
CPC ....... *H04W 48/06* (2013.01); *H04W 28/0289* (2013.01)

(58) Field of Classification Search
CPC .................... H04W 48/06; H04W 28/0289
See application file for complete search history.

(56) References Cited

U.S. PATENT DOCUMENTS

| 20,040,643 | 2/2012 | Diachina et al. | 455/411 |
| 30,242,955 | 9/2013 | Fan et al. | 370/336 |
| 50,141,007 | 5/2015 | Du et al. | 455/434 |

(Continued)

FOREIGN PATENT DOCUMENTS

| CN | 104509169 A | 5/2012 |
| EP | 3099109 A1 | 8/2014 |

(Continued)

OTHER PUBLICATIONS

International Search Report and Written Opinion of International Search Authority for PCT/CN2018/071705 dated Mar. 28, 2018 (9 pages).

(Continued)

*Primary Examiner* — Samina F Choudhry
(74) *Attorney, Agent, or Firm* — Imperium Patent Works; Zheng Jin

(57) ABSTRACT

A generic access control procedure is proposed. Every action that is subject to access control is associated with an access category, and each access category is in turn associated with a set of access control parameters. From the APP layer, a UE detects an action that is subject to access control. The UE obtains and stores access categorization rules. In NAS layer, the UE determines the access category for the action. The UE then determines the set of access control parameters for the action. In AS layer, the UE finally applies the set of access control parameters to the action and makes a barring decision for the action. By defining a generic access control procedure and separating access control functions into NAS layer and AS layer, the generic access control is simplified and extendible.

20 Claims, 9 Drawing Sheets

(56) References Cited

U.S. PATENT DOCUMENTS

| | | | |
|---|---|---|---|
| 2015/0036489 A1* | 2/2015 | Rajadurai | H04W 28/0205 |
| | | | 370/230 |
| 2015/0064080 A1 | 3/2015 | Skakoon | 422/419 |
| 2015/0208334 A1* | 7/2015 | Zhang | H04W 48/06 |
| | | | 455/434 |
| 2016/0212653 A1* | 7/2016 | Wang | A61B 10/0051 |
| 2016/0219493 A1* | 7/2016 | Kim | H04W 48/06 |
| 2019/0327663 A1 | 10/2019 | Wirth et al. | |

FOREIGN PATENT DOCUMENTS

| | | |
|---|---|---|
| WO | WO2013114278 A1 | 1/2012 |
| WO | WO2015031202 A1 | 8/2013 |
| WO | WO2016118282 A1 | 1/2015 |
| WO | WO2018127505 A1 | 1/2017 |

OTHER PUBLICATIONS

EPO, search report for the EP patent application 18736554.9 dated Dec. 6, 2019 (11 pages).
S1-162043 3GPP TSG-SA WG1 #75, LG Electronics Inc., "Discussion on Access Control", San Francisco, USA, Aug. 22-26, 2016 (3 pages) *p. 3*.
C1-171579 3GPP TSG CT WG1 Meeting #103, MediaTek Inc., "Discussion on Unified access Control in 5GS", Spakane (WA) USA, Apr. 3-7, 2017 (5 pages) *paragraph [02.1]*.

* cited by examiner

ENHANCEMENT OF UNIFIED ACCESS CONTROL

CROSS REFERENCE TO RELATED APPLICATIONS

This application claims priority under 35 U.S.C. § 119 from U.S. Provisional Application No. 62/443,642, entitled "Generic Access Control", filed on Jan. 6, 2017; the subject matter of which is incorporated herein by reference.

TECHNICAL FIELD

The disclosed embodiments relate generally to New Radio (NR) systems, and, more particularly, to generic access control and barring mechanism for user equipments (UEs) in new radio (NR) systems.

BACKGROUND

Modern networks use congestion control and congestion avoidance techniques to try to avoid network congestion. LTE has specified several barring mechanisms for concurrent congestion control. Access Class Barring (ACB) is a mechanism to limit the number of simultaneous access attempts from certain UEs. All UEs are member of one out of ten randomly allocated mobile populations, defined as access class 0 to 9. The population number is stored in UE's SIM/USIM. In addition, the UEs may be members of one or more out of five special categories (e.g., Access Class 11 to 15), also stored in the SIM/USIM. Under the ACB mechanism, the network operator may prevent certain UEs from making access attempts or responding to pages in specific areas of a PLMN based on the corresponding access class. Enhanced access barring (EAB) is an enhanced access barring mechanism to avoid Machine Type Communication (MTC) overload. Service Specific Access Control (SSAC) is used to apply independent access control for telephony services such as IP Multimedia Subsystem multimedia telephony (MMTEL) services. Application-specific Congestion control for Data Communication (ACDC) is introduced for specific applications. It can be seen that access control is implemented by a multitude of mechanisms with slightly different purpose, which has led to considerable complexity and difficulty in extending the functionality without introducing unwanted function interactions.

LTE specifies several barring mechanisms for concurrent congestion control in different layers. In non-access stratum (NAS) layer, for RRC Idle mode, LTE specifies Service Specific Access Control (SSAC) for MMTEL services and EAB for MTC devices. For RRC Connected mode, SSAC may be applied. In Access stratum (AS) layer, for RRC Idle mode, ACB is in general applicable to all types of services and devices. For RRC Connected mode, random access backoff, RRC reject/release, and scheduling request (SR) masking can be used as well. The access control functions are related to UE state transitions, from Idle to Connected mode, which has caused problems in allowing new usage of Ide and Connected modes.

A solution is sought.

SUMMARY

A generic access control procedure is proposed. Every action that is subject to access control is associated with an access category, and each access category is in turn associated with a set of access control parameters. From the APP layer, a UE detects an action that is subject to access control. The UE obtains and stores access categorization rules. In NAS layer, the UE determines the access category for the action. The UE then determines the set of access control parameters for the action. In AS layer, the UE finally applies the set of access control parameters to the action and makes a barring decision for the action. By defining a generic access control procedure and separating access control functions into NAS layer and AS layer, the generic access control is simplified and extendible.

In one embodiment, the UE obtains a set of access categorization rules in a mobile communication network. Each access categorization rule defines one or more conditions of a match to an access category. The UE initiates an action that is subject to access barring control. The UE determines an access category for the action in a categorization layer (e.g., a non-access stratum (NAS) layer) by matching the action using the access categorization rules. The access category is associated with a set of access control parameters. The UE performs access barring for the action in a barring check layer (e.g., an access stratum (AS) layer) by performing a random draw using the set of access control parameters.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
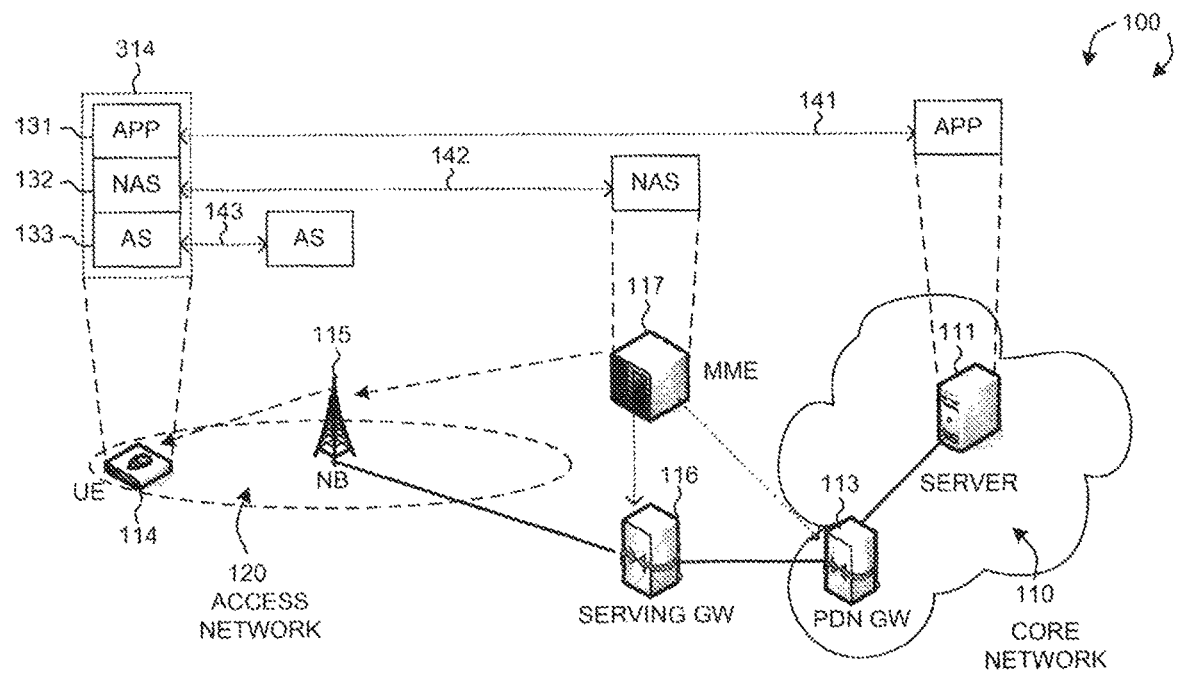
FIG. 1 illustrates a new radio (NR) network that supports generic access control in accordance with one novel aspect.

FIG. 1 illustrates a new radio (NR) or LTE network that supports generic access control in accordance with one novel aspect. NR/LTE network 100 comprises an application server 111 that provides various services by communicating with a plurality of user equipments (e.g., UE 114 as illustrated in FIG. 1). In FIG. 1, server 111 and a packet data network gateway (PDN GW) 113 belong to part of a core network 110. UE 114 and its serving base station (NB) 115 belong to part of a radio access network (RAN) 120. Server 111 communicates with UE 114 through PDN GW 113, serving GW 116, and NB 115. A mobility management entity (MME) 117 communicates with NB 115, serving GW 116 and PDN GW 113 for mobility management of wireless access devices in NR/LTE network 100.

In the example of FIG. 1, server 111 provides various services/applications in application (APP) protocol layer. To provide the end-to-end services, server 111 communicates with the plurality of UEs in the 3GPP network. Each UE (e.g. UE 114) comprises various protocol layer modules to support the end-to-end applications and data connections. In the application level, APP module 131 communicates with server 111 in APP protocol layer (e.g., depicted by dashed line 141), which provides the end-to-end control/data. In the network or NAS level, NAS module 132 communicates with MME 117 in non-access stratum protocol layer (e.g., depicted by dashed line 142), which supports mobility management and other signaling functionality. In the radio network access (RAN) or AS level, RRC module 133 communicates with NB 115 in radio resource control (RRC) protocol layer (e.g., depicted by dashed line 143), which takes care of broadcast of system information, RRC connection control, paging, radio configuration control, QoS control, etc.

LTE specifies several barring mechanisms for concurrent congestion control in different layers. Access and barring control is implemented by a multitude of mechanisms with slightly different purpose, which has led to considerable complexity and difficulty in extending the functionality without introducing unwanted function interactions. Furthermore, the access control functions are related to UE state transitions, from Idle to Connected mode, which has caused problems in allowing new usage of Ide and Connected modes.

It is an objection of the current invention to specify a novel access control procedure that involves the network and the UE that can replace all the existing access control functions. The proposed access control procedure is simpler in that it follows steps with specific purposes and is thereby more easily extendible than prior art. It is an object of the current invention that the new access control procedure can implement a generic parameterized step of barring determination, making the new procedure simpler. It is an object of the current invention that the new access control procedure is less dependent or independent of UE state transactions.

In accordance with one novel aspect, every action that is subject to access control is associated with an access category (ACAT), and each access category is in turn associated with a set of access control parameters. From the application layer, a UE detects an action that is subject to access control. A UE obtains and stores access categorization rules. In NAS layer, the UE determines the access category for the action. The UE then determines the set of access control parameters for the action. In AS layer, the UE finally applies the set of access control parameters to the action and makes a barring decision for the action. By defining a generic access control procedure and separating access control functions into NAS layer and AS layer, the UE access control mechanism is simplified and extendible.

Figure 2:
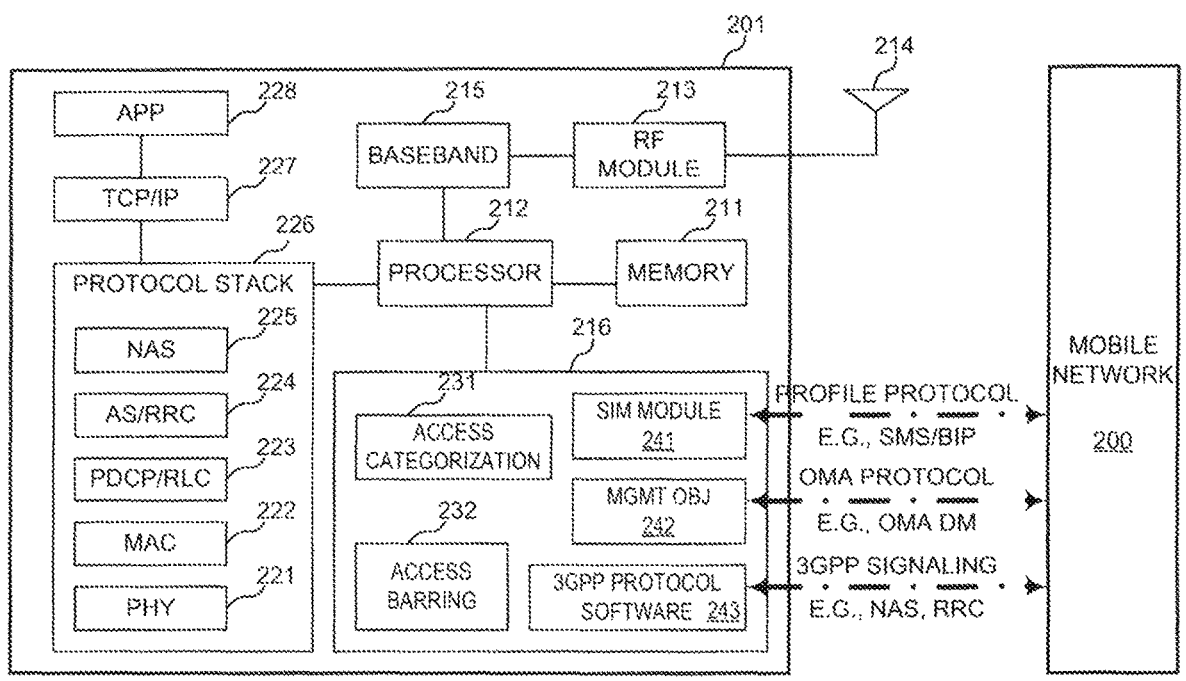
FIG. 2 is a simplified block diagram of a user equipment (UE) that supports certain embodiments of the present invention.

FIG. 2 is a simplified block diagram of a user equipment (UE) 201 that supports certain embodiments of the present invention. UE 201 comprises memory 211, a processor 212, a radio frequency (RF) transceiver 213 coupled to antenna 214, a baseband module 215, a 3GPP protocol stack module 226 supporting various protocol layers including NAS 225, AS/RRC 224, PDCP/RLC 223, MAC 222 and PHY 221, a TCP/IP protocol stack module 227, an application module APP 228. For UE 201, antenna 214 transmits and receives radio signals. RF transceiver module 213, coupled with the antenna, receives RF signals from the antenna, converts them to baseband signals and sends them to processor 212. RF transceiver 213 also converts received baseband signals from the processor, converts them to RF signals, and sends out to antenna 214. Processor 212 processes the received baseband signals and invokes different functional modules and circuits to perform features in UE 201.

UE 201 further comprises an access barring management module 216 including an access categorization module 231, an access barring module 232, a subscriber identification module (SIM) 241, a management object (MO) module 242, and a 3GPP protocol software module 243. The various function modules and circuits may be implemented and configured by software, firmware, hardware, and any combination thereof. The function modules and circuits, when executed by processor 212 (via program instructions contained in memory 211), interwork with each other to allow UE 201 to perform certain embodiments of access control of the present invention accordingly. For example, each functional module or circuit may comprise a processor together with corresponding program instructions. In one example, UE 201 receives and stores provisioning for access categorization rules from mobile network 200, detects an action that is subject to access barring, determines an access category for the action via access categorization module 231 based on the stored access categorization rules, and applies access barring for the action via access barring module 232 and making barring decision based on access control parameters associated with the access category.

Figure 3:
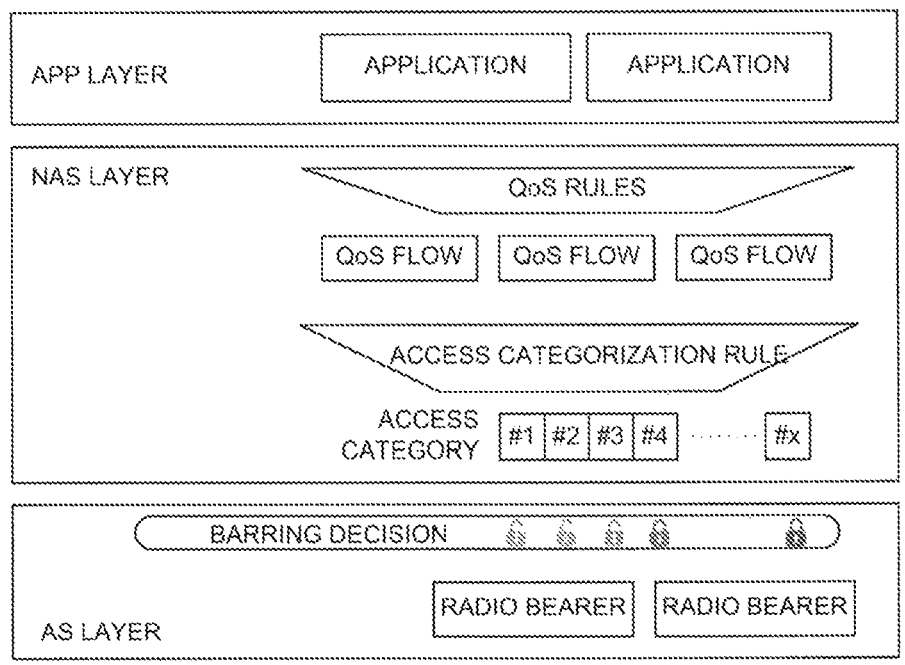
FIG. 3 illustrates an architecture example of generic access control where the functionalities are separated into NAS and AS layer accordingly.

FIG. 3 illustrates an architecture example of generic access control where the functionalities are separated into NAS and AS layer accordingly. In the example of FIG. 3, a UE comprises an APP layer, NAS layer, and AS layer. The APP layer initiates an action, e.g., a transmission request that is subject to access control. The NAS layer handles QoS rules and QoS flow for different applications. In addition, the NAS layer determines an access category (ACAT), e.g., ACAT #1, #2, . . . # X for the action based on stored access categorization rules. The AS layer makes the actual barring decision for the action based on access control parameters associated with the access category.

Figure 4:
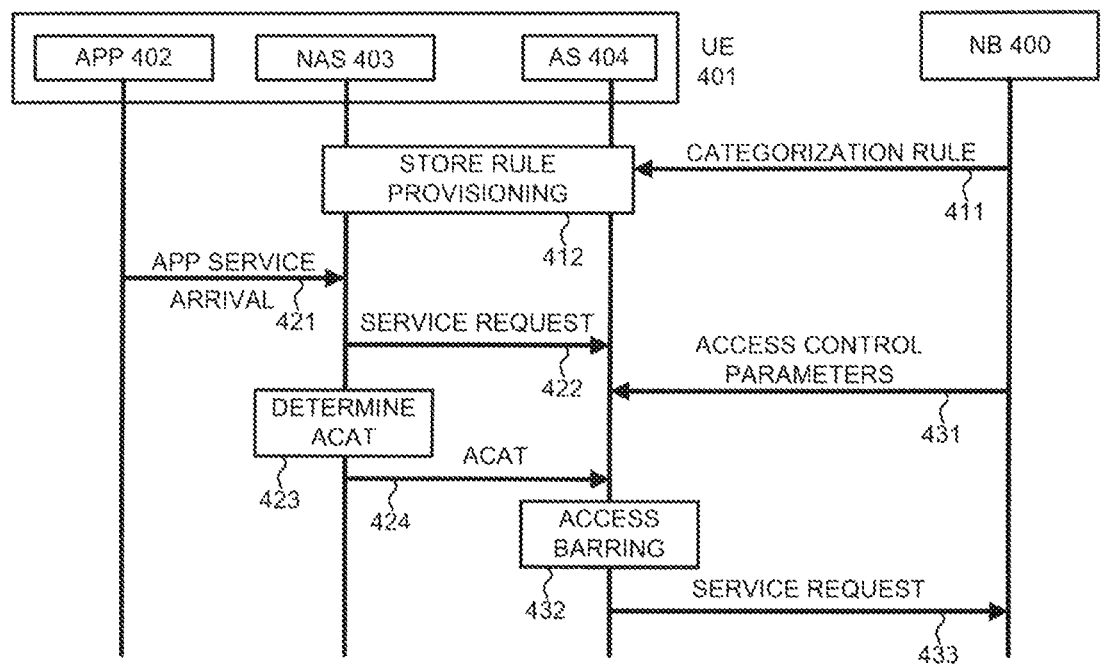
FIG. 4 illustrates a method flow of generic access control where the functionalities are separated into NAS and AS layer accordingly.

FIG. 4 illustrates a method flow of generic access control where the functionalities are separated into NAS and AS layer accordingly. UE 401 comprises an APP layer 402, a NAS layer 403, and an AS layer 404. In step 411, UE 401 receives access categorization rules from network/base station NB 400. In step 412, UE 401 stores the access categorization rule provisioning including information on conditions consisting of fields identities, threshold values or match values and logical operators. In step 421, APP 402 initiates an APP service request to NAS 403. In step 422, NAS 403 forwards the APP service request to AS 404 to be sent out to the network. The APP service request is subject to access barring control. In step 423, NAS 403 determines the access category (ACAT) for the service request. In step 424, NAS 403 forwards the determined ACAT to AS 404. Meanwhile, in step 431, NB 400 provides access control parameters for each ACAT to AS 404, e.g., via SIB broadcasting. The access control parameters comprise a barring probability or threshold for a random draw barring decision, a barring time or max barring time, a non-barred time or max non-barred time, and whether the ACAT is priority-dependent, etc. In step 432, AS 404 performs access barring for the service request based on the ACAT and based on the access control parameters for the ACAT. Finally, if access is allowed, then in step 433, AS 404 transmits the service request to NB 400 for subsequent communication.

Figure 5:
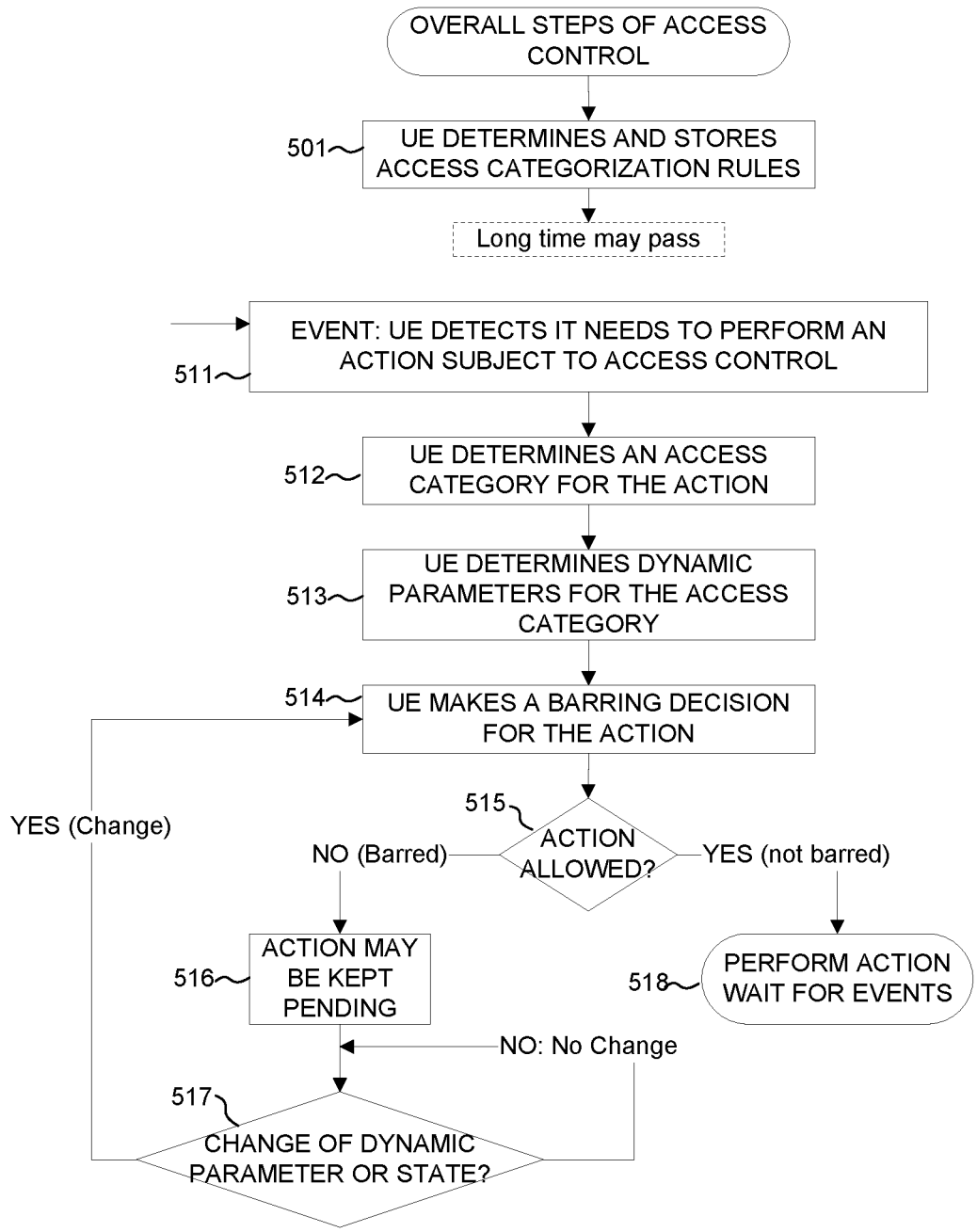
FIG. 5 illustrates all the steps taken together for generic access control.

FIG. 5 illustrates all the steps taken together for generic access control of a UE. First, in order to allow flexibility and extendibility and operator control, it is proposed that the UE determines and stores access categorization rules (501), i.e. that such rules do not need to be hardcoded but can be installed in the UE. This step can be done in different ways and the UE would typically store such rules in long term memory to avoid the need to re-provide rules and information to the UE to re-determine rules very often. Referring back to FIG. 2, in a first option, the UE stores the rules in its SIM module 241 over profile protocol, e.g., SMS/BIP. In a second option, the UE stores the rules via its MO module 242 over OMA protocol, e.g., OMA DM. In a third option, the UE stores the rules via its 3GPP protocol software module 243 over 3GPP signaling, e.g., NAS/RRC. The subscriber identification module can be one of the following module: SIM, USIM, profile on eUICC, image on iUICC, and software subscription profile.

The initial step (511) is that the UE detects the need to perform an action that involves wireless transfer of information or data that is or may be subject to access control, typically this is transmission of a request e.g. a signaling message, make an access e.g. by a random-access channel, or by some other common channel or common radio resource, shared with other UEs, or just initiation of communication. In a subsequent step (512), the UE determines the access category of the said action (in 511). The term access category (abbreviated ACAT) is used in this document denoting a label or identifier that identifies and discriminates different actions that are subject to access control, and the access category is used to be able to trigger different or same access control decisions for different actions (action in 511). A main benefit of specifying an access category or similar label which is not service specific, is that it enables to split the access control functionality into service dependent parts and service agnostic parts. Other terms could of course be used for this, and the intention here is to cover all sorts of alternative service agnostic naming, e.g. access cause, cause, label etc. The term access categorization rules are used to denote rules that are applied to determine an access category for an action.

In FIG. 5, subsequent to step 512, the UE performs step 513, determining dynamic parameters for the access category. The dynamic parameters are the ones that control the barring decision in step 514 and its applicability. The dynamic parameters could be simply received from the NB, e.g. by System Information Broadcast. However, to handle more flexible scenarios, the parameters could be received by the UE from another network entity, or the NB could provide parameters for the other communication link. Furthermore, in a novel embodiment, dynamic parameters may be received as a response to a first transmission from the communication counterpart, i.e. invoking the access control after the first transmission. Furthermore, the dynamic parameters may be novel and different from prior art, e.g. timer start values could be random values controlled by a received parameter.

In step 515, the UE makes a decision whether to allow or not allow the said action. This is here called a "barring decision". The proposed detailed logic for such decision is described later but it is assumed that the UE takes into account state, such as running timers, if any, and the potential establishment of new state by random draw decisions, start/restart of timers etc. If the outcome of the barring decision (515) is that the action is allowed, the UE goes ahead, performs the action and subsequent communication and then just waits for another trigger (518). If the outcome of the barring decision (515) is that the action is not allowed (barred), the action may remain pending (516). In case barred actions are pending, the UE need to monitor for changes in state (timer expiry) or change in dynamic parameters, e.g. change in parameters broadcasted by the NB. When parameters or state is changed (517) and there are pending actions, the UE need to make another barring decision (514) whether to allow pending actions or not. In one preferred embodiment, the UE always allows pending actions that has been barred once. In another embodiment, the UE just re-performs the decision algorithm in the same way for pending actions as for initially detected actions.

Figure 6:
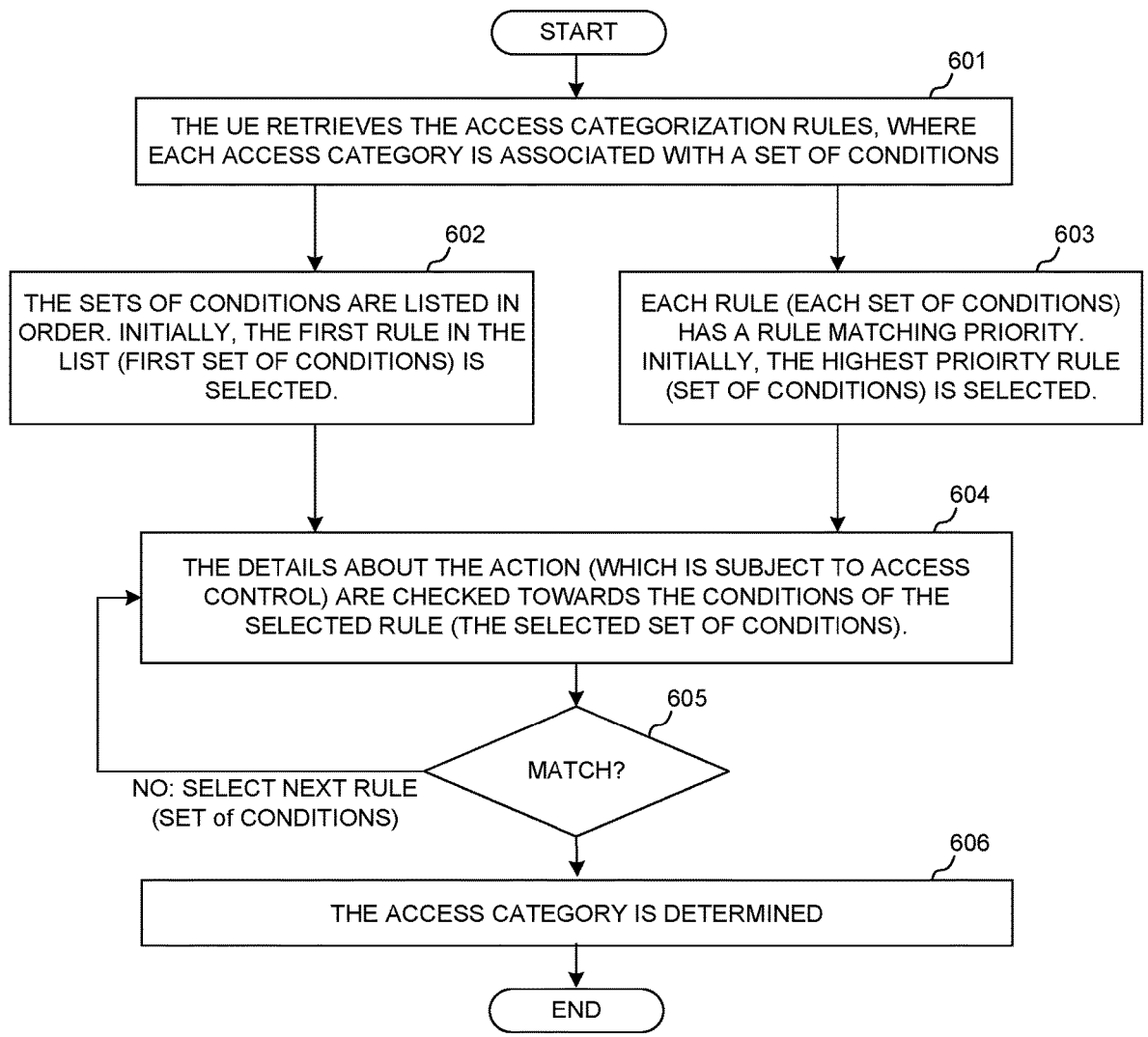
FIG. 6 illustrates the steps of access category determination for generic access control.

FIG. 6 illustrates the steps of access category determination for generic access control. In step 601, a UE retrieves the access categorization rules. Each access category is associated with a set of conditions. It is proposed that either an order or a priority is provided together with the rules and applied when the rules are evaluated. In a first example, rule ordering is used and the first rule that applies to the action determines the access category. In step 602, the set or conditions are listed in order. Initially, the first rule in the list (first set of conditions) is selected. In a second example, rule priority is used and the highest priority rule that applies to the action determines the access category. In step 603, each rule (each set of conditions) has a rule matching priority. Initially, the highest priority rule (set of conditions) is selected. Of course, it is possible to combine these concepts, e.g., execute the rules of a certain priority in a specific order. After step 602 or step 603, in step 604, the details about the action which is subject to access control are checked towards the conditions of the selected rule (the selected set of conditions). In step 605, the UE determines whether a match is found for the action. If no match is found, then the UE goes back to step 604 and select the next rule (set of conditions). If match is found, then the access category for the action is determined (606).

In general, the UE determines the access category by applying at least one rule that has one or more conditions that take into account one or more of a service type such as MO, MT, Signaling, Data, Emergency; stored SIM information such as an access class; subscription information such as subscriber priority (e.g., gold, silver, bronze); a QoS profile such as QoS flow identity, priority, GBR parameter, packet delay budget, QoS class identifier, radio bearer parameters; PDU session information such as network slice, PDN identification, domain network name; application information (IMS voice, IMS video, other prioritized application not determined by QoS flow); signaling information at signaling (NAS signaling, EMM/ESN, IMS signaling); and a UE state such as Idle and Connected state. Note that the ACAT identifier can be a structured identifier, where sub-parts such as priority, CN/slice, priority relationship group can be identified by masking the identifier.

Figure 7A:
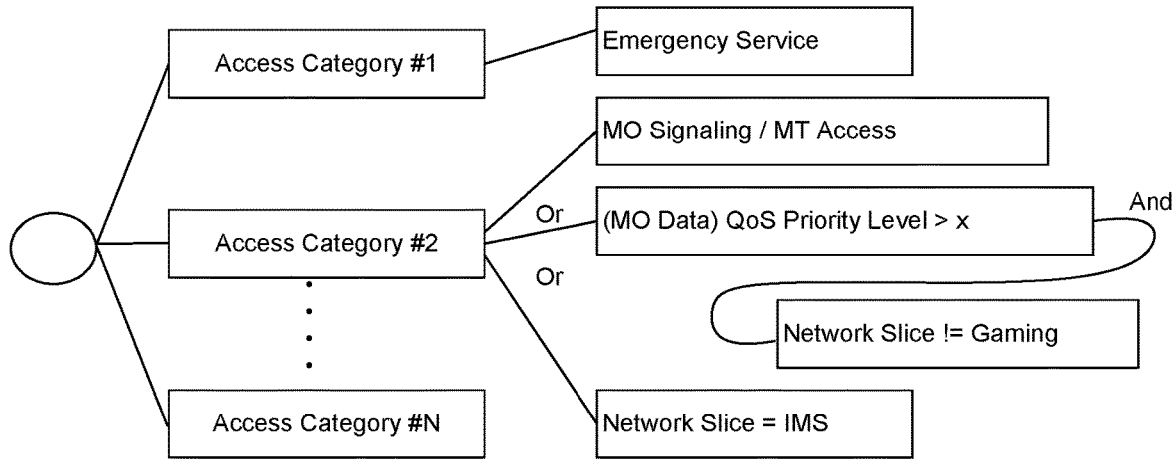
FIG. 7A illustrates a first embodiment of access categorization rules.

FIG. 7A illustrates a first embodiment of access categorization rules. In the embodiment of FIG. 7A, ACAT #1 is for Emergency call, ACAT #2 is for Type=Mobile Originating (MO) Signaling OR Type=Mobile Terminated (MT) Access OR (Type=MO Data AND QoS scheduling priority>X AND NOT (Network Slice="Gaming")) OR Network Slice="IMS". The conditions are of course not limited to this. All service, QoS, network partition, subscription, UE type aspects could be considered.

Figure 7B:
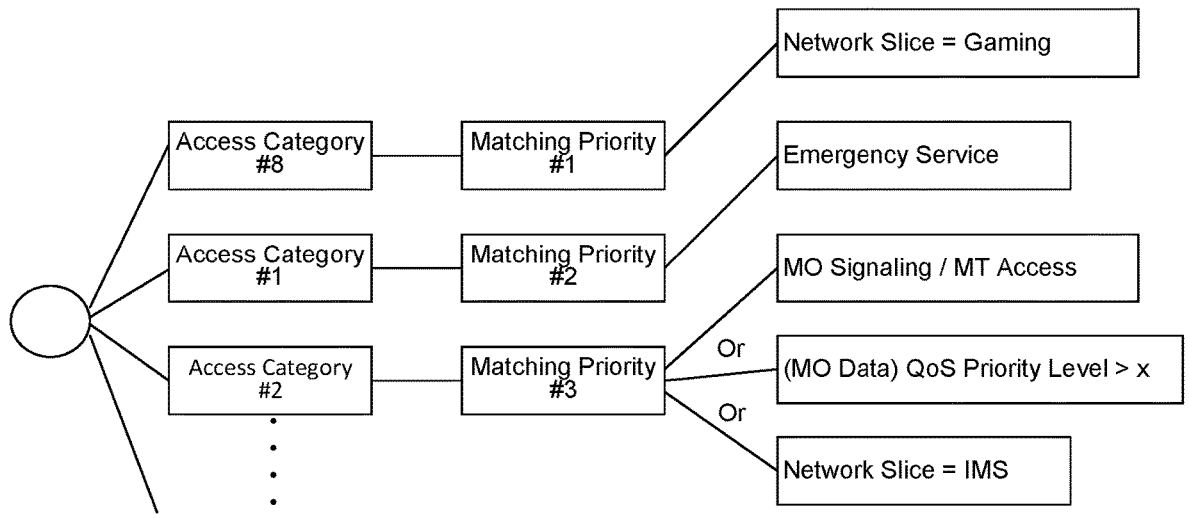
FIG. 7B illustrates a second embodiment of access categorization rules.

FIG. 7B illustrates a second embodiment of access categorization rules. In the embodiment of FIG. 7B, the concept of rule priority or rule matching priority is illustrated, where each rule has a rule matching priority. For example, the first matching priority is for rule "Network Slice=Gaming" associated with ACAT #8, the second matching priority is for rule "Service=Emergency" associated with ACAT #1, the third marching priority is for rule "Type=MO signaling OR Type=MT access, OR Type=MO data AND QoS scheduling priority>X, OR Network Slice=IMS" associated with ACAT #2.

There are three different aspects of the barring decision, a) the behavior related to a barring timer, b) the behavior related to a non-barring timer, c) the concept of access category priority. NOTE the access category priority is not the rule matching priority, but another kind of priority that shows a relation between different access categories. It is proposed that access categories that are inter-related can be grouped and within such a group, different access categories can have different priorities, where e.g. if a decision has been taken that access category X is barred, then all access categories in the same group as X, with the same or lower priority are also barred by this decision. On the other hand, if a decision has been taken that access category Y is not barred, then all access categories in the same group as Y with the same or higher priority are also not barred. A benefit is that separate barring decisions is not needed for all access categories. The concept of priority is a simple and flexible mechanism that allows both coarse grained barring, similar to legacy mechanisms such as Access Class Barring, and fine-grained application specific barring, such as ACDC. In one embodiment, the access category priority and the access category priority grouping can be derived by the access categorization rules at access category determination as additional outcomes in addition to the access category itself. Whether to apply the priority or not is determined by the dynamic parameters for the access category, e.g. provided by system information broadcast by the NB.

Figure 8:
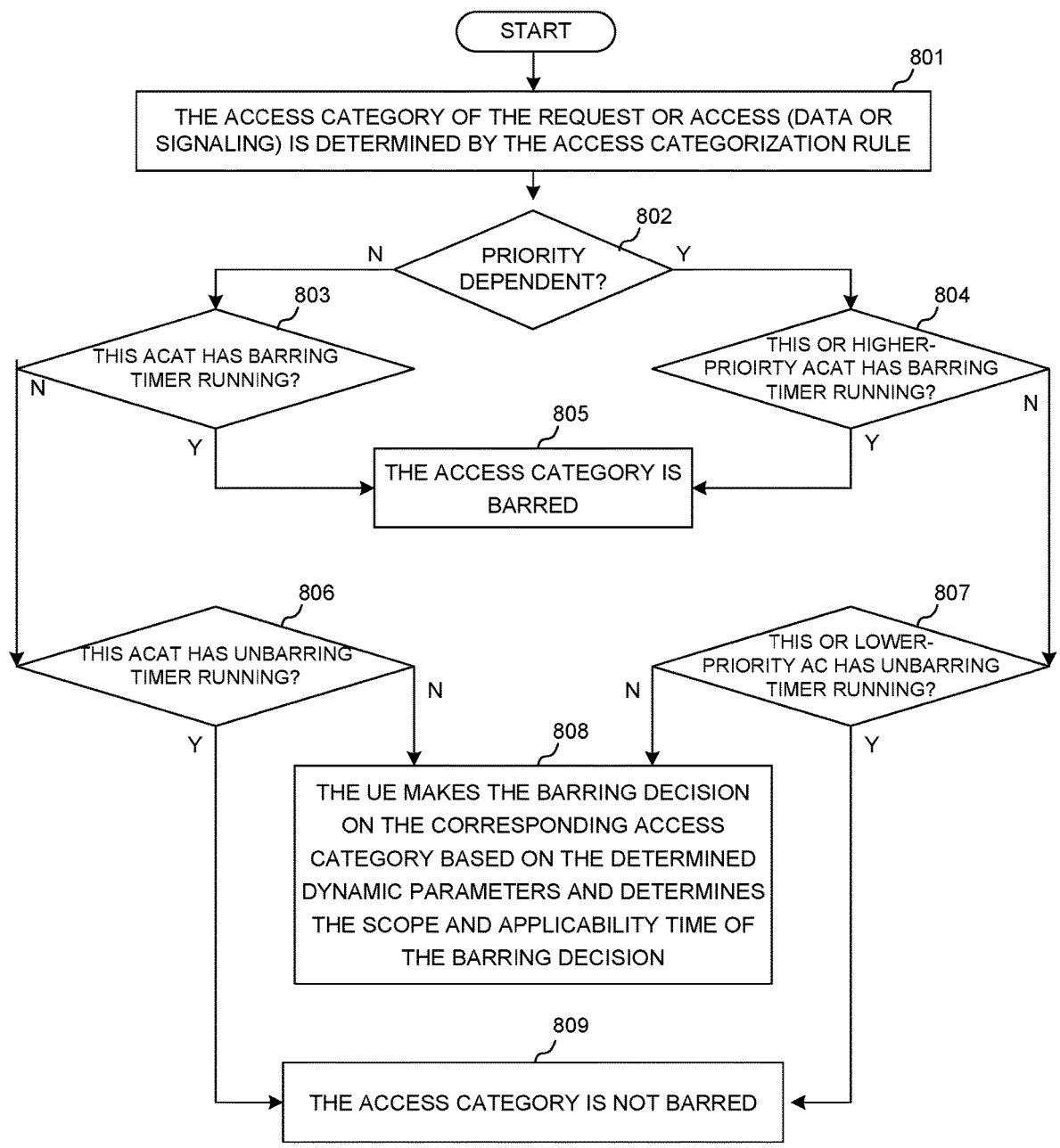
FIG. 8 illustrates the generic steps of making barring decision for an access category.

FIG. 8 illustrates the generic steps of making barring decision by a UE for an access category considering whether the ACAT is priority-dependent. In FIG. 8, in step 801, the access category (ACAT) of the request or access (data or signaling) from the UE is determined by the access categorization rule. In step 802, the UE checks whether the ACAT is priority dependent. If the ACAT is not priority dependent, then the UE goes to step 803 and checks whether the ACAT has a barring timer running. If there is barring timer running, then the access category is barred (805). If there is no barring timer running, then the UE goes to step 806 and checks whether the ACAT has an unbarring timer running. If there is unbarring timer running, then the access category is not barred (809). If there is no unbarring timer running from step 806, then the UE goes to step 808 and makes barring decision on the corresponding ACAT based on the determined dynamic parameters and determines the scope and applicability time of the barring decision. Going back to step 802, if the ACAT is priority dependent, then the UE goes to step 804 and checks whether this ACAT or any other higher-priority ACAT has a barring timer running. If the answer is yes, then the access category is barred (805). If the answer is no, then the UE goes to step 807 and checks whether this ACAT or any other lower-priority ACAT has an unbarring timer running. If there is unbarring timer running, then the access category is not barred (809). If there is no unbarring timer running from step 807, then the UE goes to step 808.

The UE determines the applicability time for a barring decision by stating a timer and applying the decision while the timer is running. The timer is initially set in one of the following ways: 1) for a barred decision, the timer is set to a received barring timer value; 2) for a barred decision, the timer is set to random value between zero and a received maximum barring timer value; 3) for a non-barred decision, the timer is set to a non-barring timer value; 4) for a non-barred decision, the timer is set to random value between zero and a maximum non-barring timer value; 5) the non-barring timer value or the maximum non-barring timer value may be received specifically for a certain access category or be common for many access categories. If there is a barred or non-barred timer running for an existing barring decision that is applicable, the UE would apply the existing decision, otherwise the UE makes a barring decision in one of the following ways: 1) the UE decides barred/non-barred based on drawing a random number and comparing it to a given threshold or barring probability; 2) when dynamic barring parameters for the access category is present in signaling, the UE always decides that there is barring; or 3) when dynamic barring parameters for the access category is not present in the signaling, the UE always decides that there is no barring.

Figure 9:
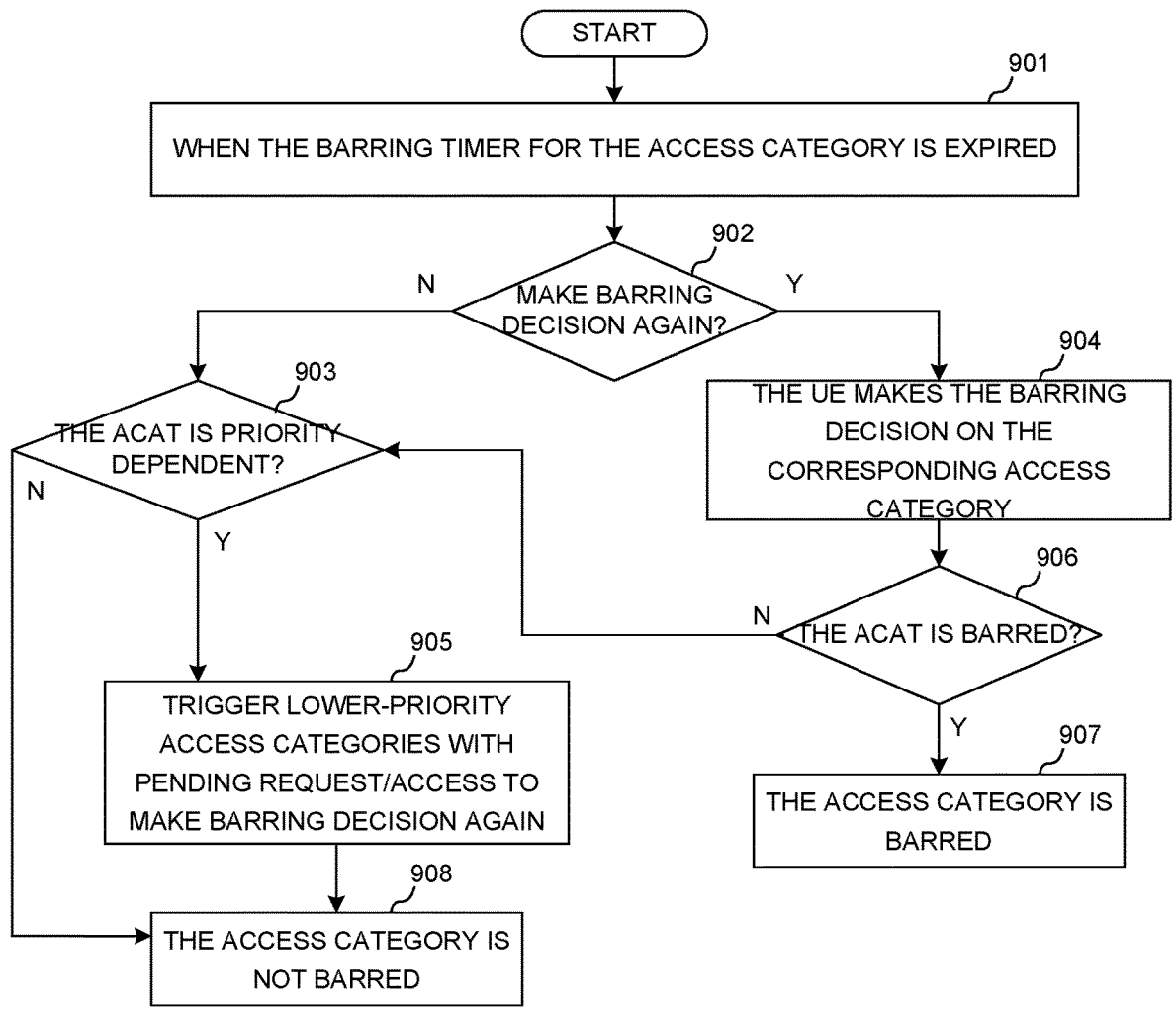
FIG. 9 illustrates the steps of making barring decision triggered by expiration of a barring timer.

FIG. 9 illustrates the steps of making barring decision by a UE triggered by expiry of a barring timer. In step 901, the UE detects that the barring timer for the access category is expired. In step 902, the UE determines whether it should make barring decision again. If the answer to step 902 is no, the UE checks whether the ACAT is priority dependent in step 903. If the answer to step 903 is no, then the ACAT is not barred (908). If the answer to step 903 is yes, then the UE triggers lower-priority access categories with pending request/access to make barring decision again (905). If the answer to step 902 is yes, then the UE makes the barring decision on the corresponding ACAT (904). In step 906, the UE checks whether the ACAT is barred. If the answer to step 906 is yes, then the ACAT is barred (907). If the answer to step 906 is no, then the UE goes to step 903.

Figure 10:
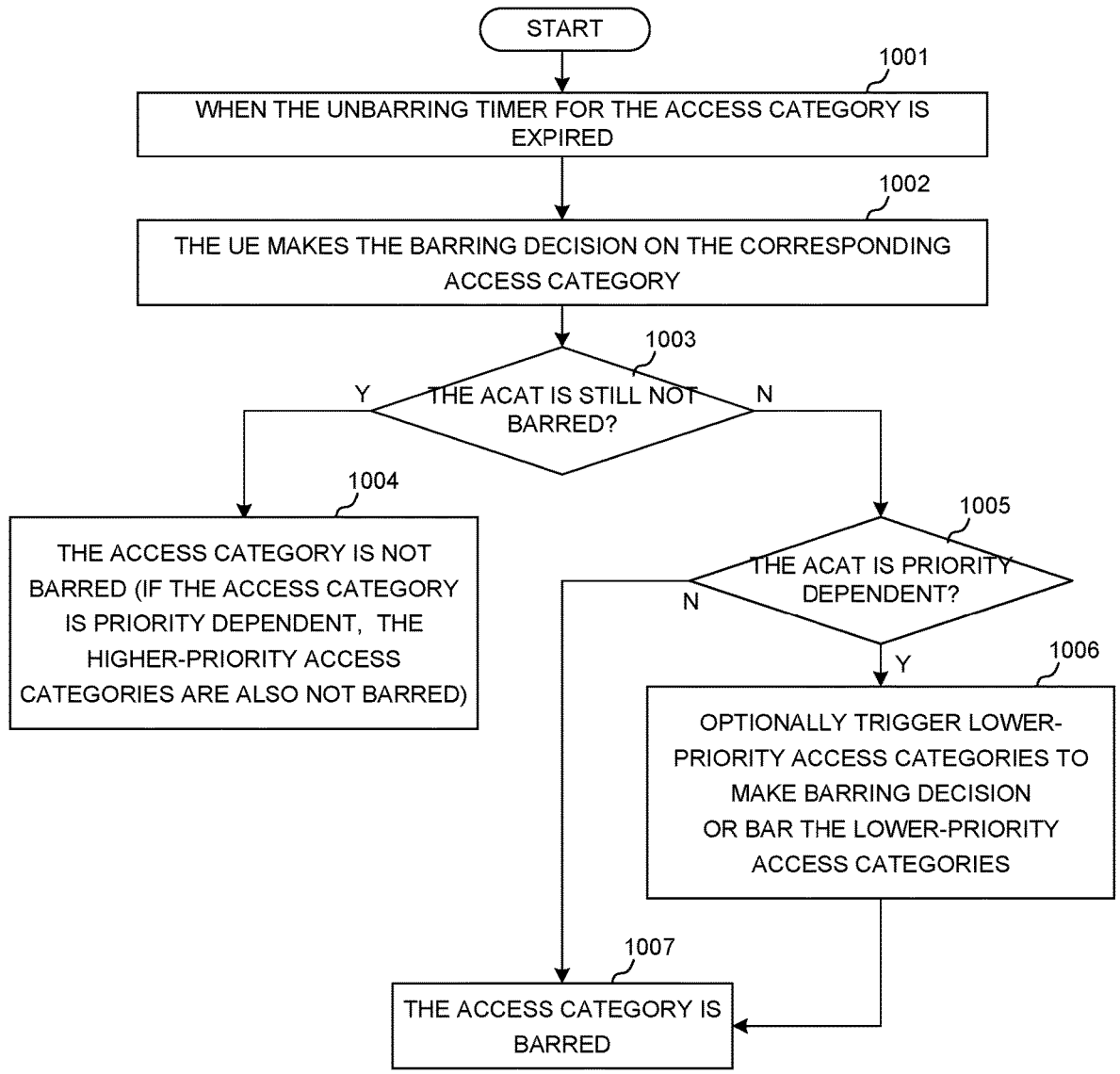
FIG. 10 illustrates the steps of making barring decision triggered by expiration of an unbarring timer.

FIG. 10 illustrates the steps of making barring decision by a UE triggered by expiry of a non-barring timer. The concept of a non-barring timer allows the expiry of this timer to trigger when to reevaluate the barring decision, i.e. the timer is started when a random draw decision is done that results in a not-barred outcome. During the running of this timer the access category and all higher priority access categories in the same access category group are not barred. When the non-barring timer is not running, new random draw decision to bar/not bar need to be done for actions that require access control, when access control is enabled (when parameters are provided). It is more flexible to use a timer rather than other conditions, such as a certain kind of state transition such as IDLE to CONNECTED.

In the example of FIG. 10, in step 1001, the UE detects the unbarring timer for the access category is expired. In step 1002, the UE makes barring decision on the corresponding ACAT. In step 1003, the UE checks whether the ACAT is still not barred. If the ACAT is not barred, then the higher-priority access categories are not barred if the ACAT is priority dependent (1004). If the ACAT is barred, then the UE checks whether the ACAT is priority dependent in step 1005. If the answer is no, then the ACAT is barred (1007). If the answer is yes, then the UE optionally triggers barring decision for lower-priority access categories (1006).

When the barring information for the access category is changed, including a new access category is created, the UE makes the barring decision on the corresponding access category promptly or makes the barring decision after expiry of the current running timer (barring timer or unbarring timer). If the access category is priority dependent, the other access category will be impacted accordingly.

Figure 11:
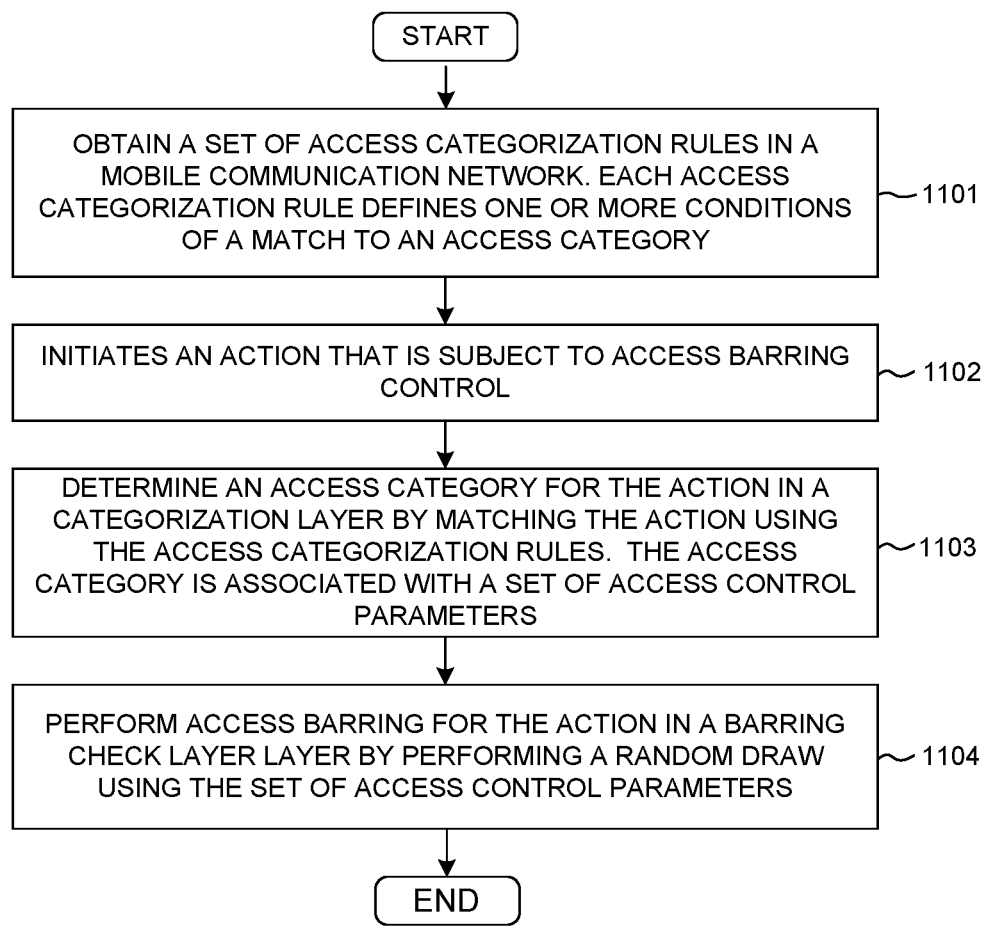
FIG. 11 is a flow chart of a method of generic access control from UE perspective in accordance with one novel aspect.

FIG. 11 is a flow chart of a method of generic access control from UE perspective in accordance with one novel aspect. In step 1101, the UE obtains a set of access categorization rules in a mobile communication network. Each access categorization rule defines one or more conditions of a match to an access category. In step 1102, the UE initiates an action that is subject to access barring control. In step 1103, the UE determines an access category for the action in a categorization layer (e.g., a non-access stratum (NAS) layer or an access stratum (AS) layer) by matching the action using the access categorization rules. The access category is associated with a set of access control parameters. In step 1104, the UE performs access barring for the action in a barring check layer (e.g., an access stratum (AS) layer or a non-access stratum (NAS) layer) by performing a random draw using the set of access control parameters.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
  obtaining a set of access categorization rules by a user equipment (UE) in a mobile communication network, wherein each access categorization rule defines one or more conditions of a match to an access category;
  initiating an action that is subject to access barring control, wherein the initiating action is initiated in an application layer, an IP Multimedia Subsystem (IMS) layer or a non-access stratum (NAS) layer, and wherein the initiating action does not transmit a barring indication;
  determining an access category for the action in a categorization layer by matching the action using the access categorization rules, wherein the access category is associated with a set of access control parameters; and
  performing access barring for the action in a barring check layer by performing a random draw using the set of access control parameters.

2. The method of claim 1, wherein the UE determines the access category by applying at least one rule that has one or more conditions that take into account one or more of a service type, stored SIM information including an access class, subscription information, a QoS profile, a session information, application information, signaling information, and a UE state.

3. The method of claim 1, wherein the set of access categorization rules is obtained from a Management Object configuration, a 3GPP signaled configuration, or a profile configuration and stored in the UE on a subscriber identification module (SIM).

4. The method of claim 3, wherein the subscriber identification module comprises at least one of a SIM, a Universal SIM (USIM), a profile on eUICC, an image on iUICC, and a software subscription profile.

5. The method of claim 1, wherein the UE applies each access categorization rule according to a predefined order or a predefined priority.

6. The method of claim 1, wherein each access category has an access priority, and wherein the access category is priority-dependent such that a lower-priority access category is barred as long as a higher-priority access category is barred.

7. The method of claim 1, wherein the access category is priority-independent such that each access category is subject to an independent access barring.

8. The method of claim 1, wherein the UE receives the set of access control parameters from the network via broadcasting system information block (SIB).

9. The method of claim 1, wherein the set of access control parameters comprises a barring probability, a barring time, a non-barred time, and a priority-dependent indication.

10. The method of claim 9, wherein the categorization layer forwards the determined access category to the barring check layer for making access barring decision.

11. A user equipment (UE) comprising:
  a memory;
  a processor, wherein the processor executes program instructions stored in the memory;
  a radio frequency (RF) receiver that obtains a set of access categorization rules in a mobile communication network, wherein each access categorization rule defines one or more conditions of a match to an access category;
  an application layer, an IP Multimedia Subsystem (IMS) layer or a non-access stratum (NAS) layer,
  that initiates an action that is subject to access barring control, wherein the action does not transmit a barring indication;
  a non-access stratum (NAS) layer that determines an access category for the action by matching the action using the access categorization rules, wherein the access category is associated with a set of access control parameters; and
  an access-stratum (AS) layer that performs access for the action by performing a random draw using the set of access control parameters.

12. The UE of claim 11, wherein the UE determines the access category by applying at least one rule that has one or more conditions that take into account one or more of a service type, stored SIM information including an access class, subscription information, a QoS profile, a session information, application information, signaling information, and a UE state.

13. The UE of claim 11, wherein the set of access categorization rules is obtained from a Management Object configuration, a 3GPP signaled configuration, or a profile configuration and stored in the UE on a subscriber identification module (SIM).

14. The UE of claim 13, wherein the subscriber identification module comprises at least one of a SIM, a Universal SIM (USIM), a profile on eUICC, an image on iUICC, and a software subscription profile.

15. The UE of claim 11, wherein the UE applies each access categorization rule according to a predefined order or a predefined priority.

16. The UE of claim 11, wherein each access category has an access priority, and wherein the access category is priority-dependent such that a lower-priority access category is barred as long as a higher-priority access category is barred.

17. The UE of claim 11, wherein the access category is priority-independent such that each access category is subject to an independent access barring.

18. The UE of claim 11, wherein the UE receives the set of access control parameters from the network via broadcasting system information block (SIB).

19. The UE of claim 11, wherein the set of access control parameters comprises a barring probability, a barring time, a non-barred time, and a priority-dependent indication.

20. The UE of claim 11, wherein the NAS layer forwards the determined access category to the AS layer for making access barring decision.

* * * * *